J. B. McMILLAN.
Corn-Planter.

No. 25,026.

Patented Aug. 9. 1859.

Witnesses.
Cha! Everett
W. Cropfield

Inventor.
J. B. McMillan

UNITED STATES PATENT OFFICE.

J. B. McMILLAN, OF TRIPTON, INDIANA.

IMPROVEMENT IN SEED-PLANTERS.

Specification forming part of Letters Patent No. 25,026, dated August 9, 1859.

*To all whom it may concern:*

Be it known that I, J. B. McMILLAN, of Tripton, in the county of Jennings and State of Indiana, have invented certain new and useful Improvements in Seed-Planters; and I hereby declare that the following is a full, clear, and exact description thereof, reference being had to the accompanying drawings, making a part of this specification, in which—

Figure 2:
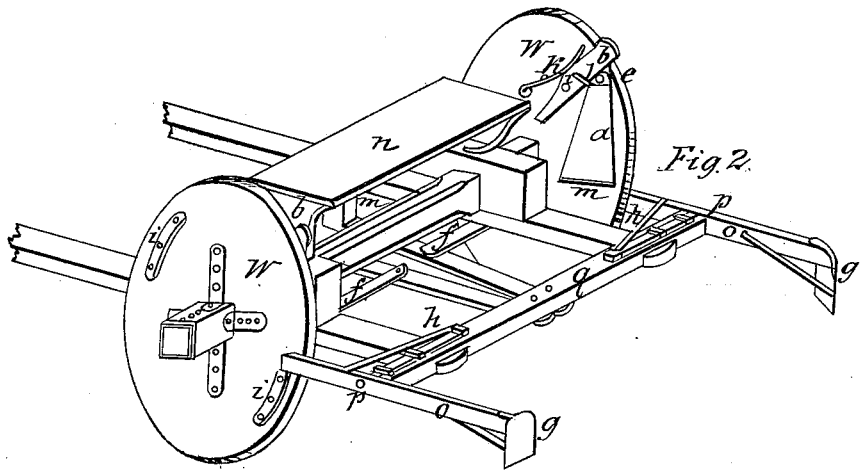
Figures 1, 3:
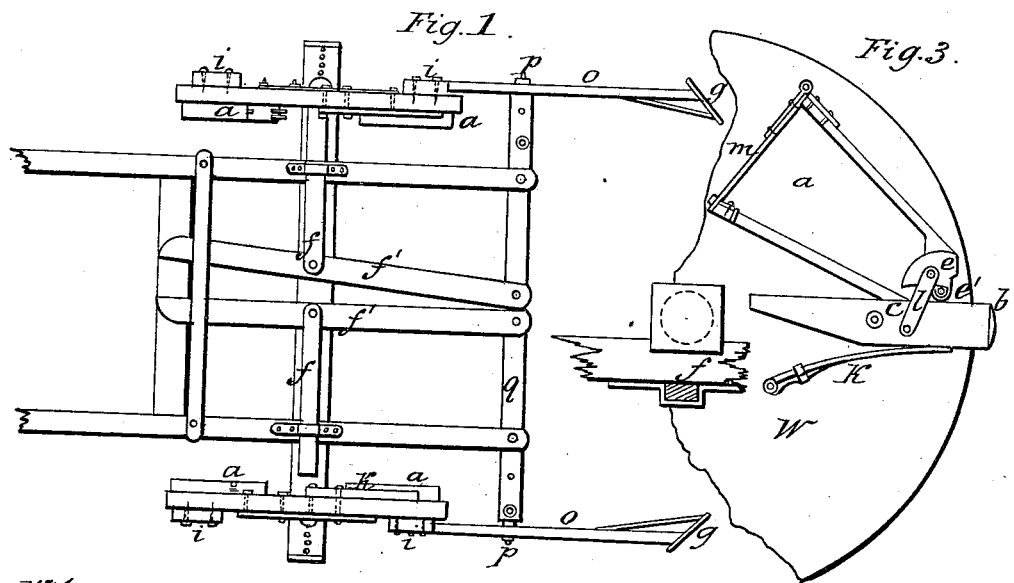

Figure 1 represents a bottom view of the machine; Fig. 2, a perspective view; and Fig. 3, an enlarged view of the inside of one of the wheels, showing details of the seed-box, &c.

The letters of reference indicate the same parts in the different figures.

My improvements relate to that class of machines which deposit seed in rows and in hills of any required distance from each other.

The machine is constructed in the general form of a cart. The axle revolves in journal-boxes. Its extremities are square, projecting beyond the wheels W, which, fitting loosely upon them, are capable of lateral movement, being secured at any desired distance apart by bolts which pass into holes in the axle through angle-irons secured to the wheels. The object of this arrangement is to regulate the width of the rows in which the seed is to be dropped. The wheels are solid disks, and may be made of boards properly secured together. Upon their inner surfaces they carry one or more seed-boxes, *a*, the number of which may be increased and their positions regulated according to the circumference of the wheels or the distance apart at which the hills are to be planted. The boxes *a* are provided with hinged covers *m* and semi-lunar valves *e*, pivoted at *e'*, which have each a cup or chamber of suitable size to contain the proper quantity of seed for each hill. Levers *b* are pivoted at *c* and held up against the valves *e* by springs *k*. These levers project a short distance beyond the peripheries of the wheels, and operate the valves *e* by means of connecting-bars *l*. Sliding bars *f* are moved horizontally in the line of the axle by levers *f'*, operated by the feet of the driver, who sits upon the seat *n*, or in any other convenient manner.

When the machine is required to be moved from place to place or to turn at the ends of the rows the bars *f* are brought inward; but when the planting operation is to be commenced they are projected sufficiently toward the inner surfaces of the wheels to come in contact with the inner arms of the levers *b* as they revolve with the wheels. This contact takes place at the moment the wheel brings the outer end of the lever *b* to its lowest point. The projecting end makes a depression in the soil, which is immediately enlarged by the sudden movement of the lever *b* upon its axis, the connection of which with the valve *e*, by means of the bar *l*, causing a simultaneous opening of the valve by a partial revolution upon its axis, discharging the seed from the chamber into the hole prepared for it, cutting off the cavity of the chamber from the mass of seed in the box. As soon as the lever *b* is released by the continuous revolution of the wheel it and the valve *e* resume their former position by the reaction of the spring *k*. The communication between the valve-chamber and the interior of the seed-box is thus reopened to refill the chamber, while the contents of the latter are prevented from escaping by the contact of the lever *b* with the pivot end of the valve *e*.

To adjustable slides upon each extremity of the cross-piece *q* are pivoted at *p* the levers *o*, each of which carries at its rear extremity a vertical covering-hoe, *g*, placed at an angle of about forty-five degrees with the direction of the row. The lever *o* is kept in an almost horizontal position by a spring, *h*.

Upon the outer surface of each wheel are placed tappets *i*, of such size and number and in such position as to elevate the forward ends of the levers *o* at the proper time, and thereby depress the hoes *g* long enough to cover the seed, the reaction of the springs *h* restoring the hoe to its former position as soon as the lever *o* is released from the action of the tappet. These hoes being adjustable in relation to each other are easily made to correspond with the wheels when their relative distance is changed.

The machine above described may be operated by horse or hand power. It is light, simple, and consequently cheap in its construction, easily repaired by any common workman, and performs its work with automatic precision.

Having thus fully described my improvements, what I claim as my invention, and desire to secure by Letters Patent of the United States, is—

The planting and covering apparatus, when constructed and arranged in the manner and for the purposes herein set forth.

J. B. McMILLAN.

Witnesses:
   CHAS. EVERETT,
   W. CROSSFIELD.